United States Patent Office.

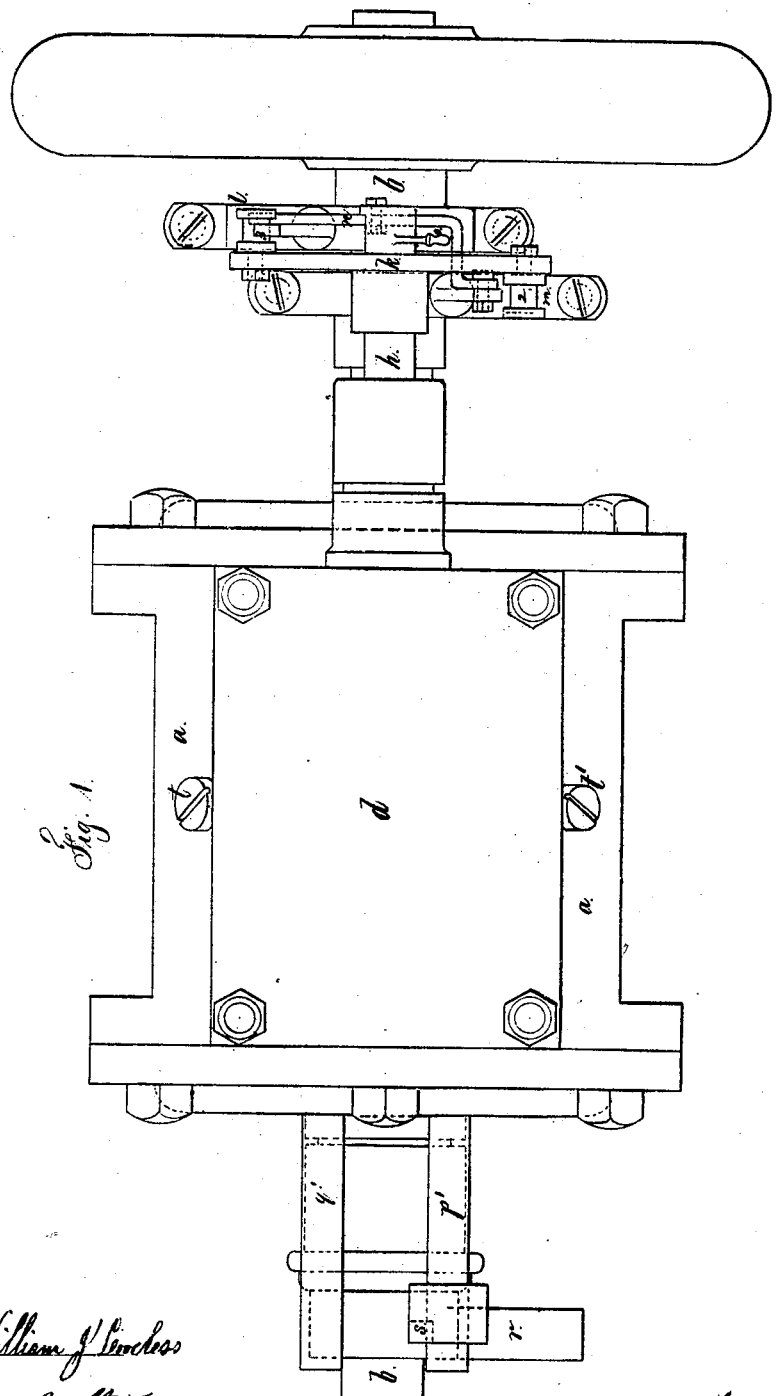

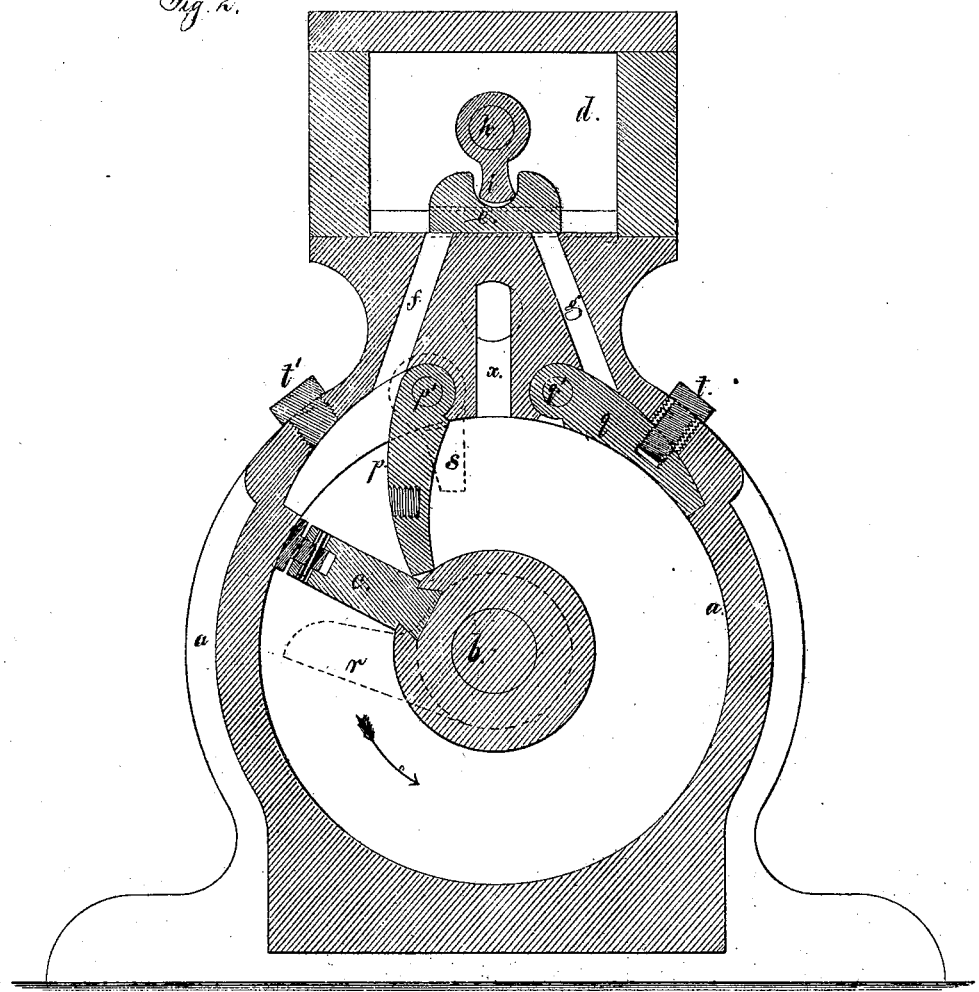

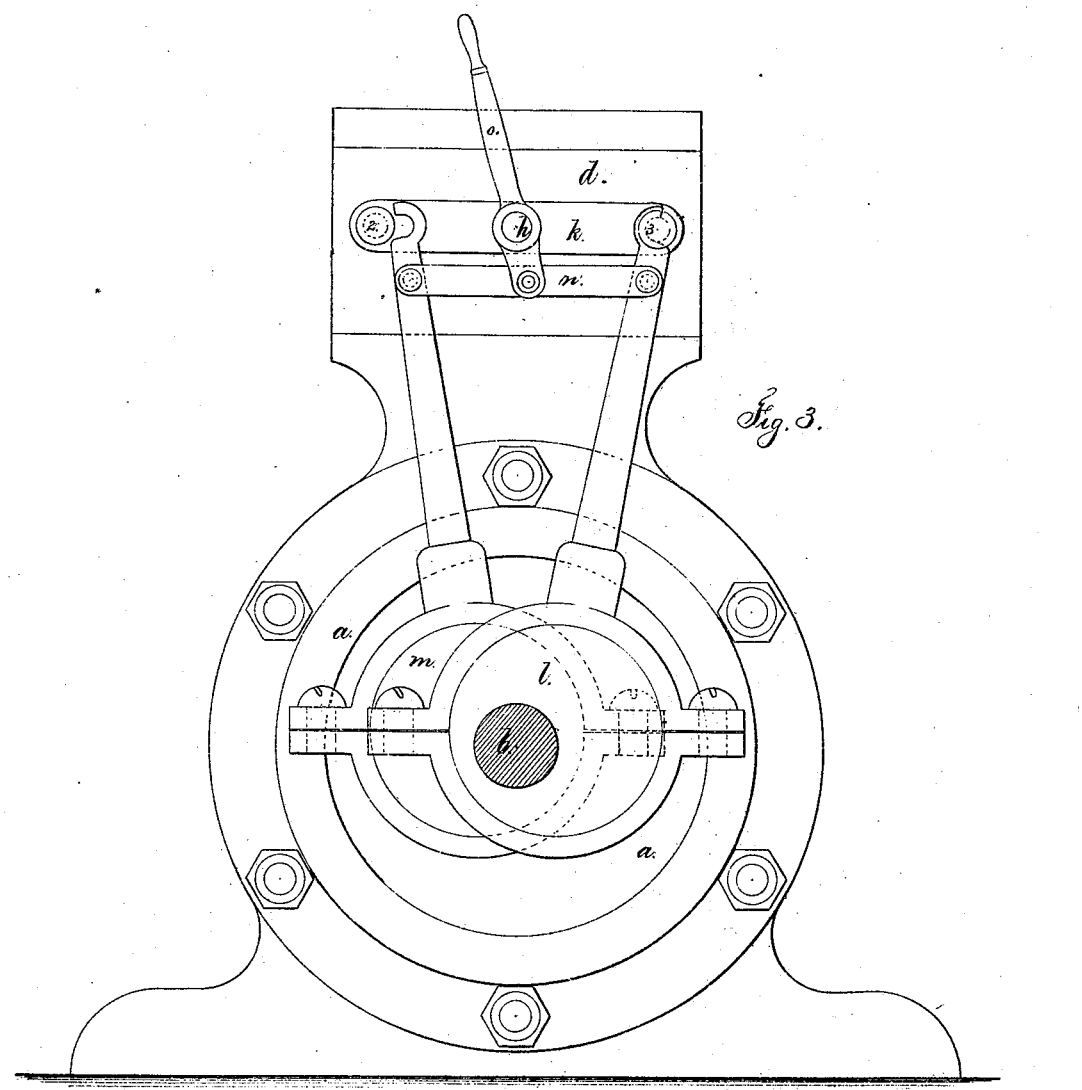

JOHN CUTHBERT, OF GLENHAM, NEW YORK.

Letters Patent No. 95,992, dated October 19, 1869.

IMPROVEMENT IN ROTARY ENGINES.

The Schedule referred to in these Letters Patent and making part of the same.

*To all whom it may concern:*

Be it known that I, JOHN CUTHBERT, of Glenham, in the county of Dutchess, and State of New York, have invented and made a new and useful Improvement in Rotary Engines; and I do hereby declare the following to be a full, clear, and exact description of the said invention, reference being had to the annexed drawing, making part of this specification, wherein—

Figure 1 is a plan of the said engine;
Figure 2 is a vertical transverse section; and
Figure 3 is an elevation, showing the eccentrics.
Similar letters denote the same parts.

The object of this invention is to provide a means for running a rotary engine in either direction, with great facility, and, at the same time, cutting off the steam, and allowing it to operate expansively.

In the drawing—

$a$ is the steam-cylinder, in the centre of which is the shaft $b$, and on the one side of said shaft the piston $c$ projects, and is provided with packings, as usual.

$d$ is the steam-chest, to which steam is to be supplied by a pipe, and in this chest $d$ is the valve $e$, that allows the steam to pass into the cylinder, by either induction-port $f$ or $g$, and moves over the said port again, so as to cut off the steam, and allow it to act expansively.

$h$ is the rock-shaft, with a toe, $i$, to operate the valve $e$, and on the outer end of the rock-shaft $h$ are arms $k$, with studs or pins, 2 and 3.

This rock-shaft is to be operated upon by an eccentric or eccentrics, to give the proper motion to the valve, and admit and cut off the steam.

The eccentric may be made so as to act with the pin 2, when going in one direction, and with the pin 3, when the engine is rotating the other way. I, however, have shown two eccentrics, $l\ m$, with their rods connected by a bar, $n$, operated upon by a lever, $o$, so as to simultaneously connect one rod, and disconnect the other.

I make use of two swinging abutments, $p$ and $q$, on shafts $p'\ q'$, and these are moved out of the way, as the piston passes, by means of cams, applied on the shaft $b$, and acting on the toes of the respective shafts.

One of these cams $r$, and its toe $s$, is shown by dotted lines in fig. 2.

It will now be understood that when the engine is running in the direction indicated in fig. 2, the abutment $q$ is not operative, and must be held firmly up, so that its under side forms part of the interior curved surface of the cylinder.

To effect this, I employ a screw, $t$, passing through the side of the cylinder into the valve, and provide a screw, $t'$, to fill the hole in the cylinder, when the valve at that side is in use as an abutment, and these screws are to be changed, when the engine is to be fitted to run the other way.

It will now be understood that the valve admits and cuts off the steam, the expansion continuing the movement until the piston passes the exhaust $x$, at which time the tappet $r$ and toe $s$, throw up the abutment $p$, so that the piston $c$ may be carried past the same by the momentum, or by a second engine upon the main shaft $b$, with its piston placed at a different point.

What I claim, and desire to secure by Letters Patent, is—

The swinging abutments $p$ and $q$, and screws $t\ t'$, in combination with the revolving piston $c$, valve $e$, and its actuating-mechanism, substantially as set forth.

In witness whereof, I have set my signature, this 5th day of July, 1869.

JOHN CUTHBERT.

Witnesses:
WILLIAM J. LOVELESS,
GEORGE CUTHBERT.